United States Patent
Stoll et al.

(10) Patent No.: US 7,277,638 B1
(45) Date of Patent: Oct. 2, 2007

(54) ADD-DROP-MULTIPLEXER AND OPTICAL WAVELENGTH DIVISION MULTIPLEX TRANSMISSION SYSTEM

(75) Inventors: Detlef Stoll, München (DE); Patrick Leisching, München (DE); Harald Bock, München (DE); Hubert Jäger, Pullach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/913,451

(22) PCT Filed: Feb. 18, 2000

(86) PCT No.: PCT/DE00/00463

§ 371 (c)(1),
(2), (4) Date: Aug. 14, 2001

(87) PCT Pub. No.: WO00/49752

PCT Pub. Date: Aug. 24, 2000

(30) Foreign Application Priority Data

Feb. 18, 1999 (DE) ................................ 199 06 813

(51) Int. Cl.
*H04J 14/02* (2006.01)
(52) U.S. Cl. .......................................... 398/82; 398/83

(58) Field of Classification Search ................... 398/50, 398/56, 82–85
See application file for complete search history.

(56) References Cited

U.S. PATENT DOCUMENTS

| 6,208,443 | B1* | 3/2001 | Liu et al. ...................... 398/9 |
| 6,545,783 | B1* | 4/2003 | Wu et al. ...................... 398/83 |
| 6,631,018 | B1* | 10/2003 | Milton et al. ................. 398/59 |
| 6,721,508 | B1* | 4/2004 | Gerstel et al. ................ 398/83 |

OTHER PUBLICATIONS

Gaudino et al., "Remote Provisioning of a Reconfigurable WDM Multichannel Add/Drop Multiplexer", Aug. 1999, IEEE Photonics Technology Letters, vol. 11, No. 8.*

* cited by examiner

*Primary Examiner*—Dalzid Singh
(74) *Attorney, Agent, or Firm*—Bell, Boyd & Lloyd LLP

(57) ABSTRACT

An add-drop multiplexer has a group filter that divides an incoming WDM signal into several channel groups of corresponding adjacent WDM channels. A reconfiguration module is connected to each channel group. A first type of module makes it possible to perform a manual configuration of the Add-Drop channels and the coupled WDM channel while a second type of module makes it possible to carry out remote configuration. A fourth type of module enables remote configuration of the drop-continue channels.

16 Claims, 4 Drawing Sheets

ADD-DROP-MULTIPLEXER AND OPTICAL WAVELENGTH DIVISION MULTIPLEX TRANSMISSION SYSTEM

BACKGROUND OF THE INVENTION

The invention relates to configurable add-drop multiplexing devices and an optical wavelength division multiplex (WDM) transmission system realized with these devices.

In purely optical WDM networks, transmission channels with different wavelengths are used for establishing data connections. At the request of customers, connections between any desired connecting points are to be made available by the network operator. To establish these connections, until now electronically operating cross-connectors/connecting-through devices were used. The same principle can also be used in principle for purely optically operating networks. However, here the use of remote-configurable optical switching devices is problematical and very cost-intensive. Such devices are known for example from DE 19 94 302 A1.

U.S. Pat. No. 5,748,350 discloses optical multiplexers/demultiplexers which are realized with the aid of filters and circulators and combine individual optical channels to form a WDM signal or divide a WDM signal into individual optical channels.

SUMMARY OF THE INVENTION

It is therefore an object of the invention to provide a configurable add-drop multiplexing device and a WDM transmission system which can be realized with a lower expenditure.

This object is achieved by an add-drop multiplexing device for an optical wavelength division multiplex transmission system wherein a group filter is provided which divides an incoming WDM signal into a plurality of channel groups with channels of different wavelengths. A plurality of exchangeable modules are provided to each of which a respective channel group is fed for connecting through and branching off channels. The exchangeable modules are one of at least first, second, and third module types. The first module type is for manual reconfiguration of connected-through and add-drop channels with which long-term connections of the channels of the channel group are realized. The second module type is for remote configuration of channels to be connected through and add-drop channels of a further channel group with which short-term connections of the channels of the further channel group are realized. The third module type is for closed connecting-through of a channel group. A combination filter is provided to which reconfigured channel groups are fed and which combines the reconfigured channel groups to form an outgoing WDM signal. An associated wavelength division multiplex transmission system is also provided comprising a plurality of the add-drop multiplexing devices described above and which are connected to one another via optical waveguides.

In the invention, a modular design is used, allowing different module types to be used according to requirements. Generally, only a small number of the switched connections have to be frequently reconfigured, while generally the majority of the connections are static and never have to be reconfigured, or only extremely rarely. There is a correspondingly great cost advantage.

It is first advantageous for the WDM signal to be divided into a plurality of channel groups, at least one of which are divided by a WDM demultiplexer into individual optical channels, which in principle can be individually branched off or connected through. One of these channel groups is assigned for example "statically", to interconnected channels for long-term connection, which are fed to a module of a technically simple configuration, while another channel group contains channels serving as short-term connections, which are constantly newly interconnected, which takes place in another module type with correspondingly more complex switching devices.

Use of the invention in ring networks, in which a considerable number of the channels are merely through-connected, is particularly advantageous. Here, the corresponding module then only comprises one optical connecting line.

In addition to the use of modules with optical switching matrices for realizing add-drop functions, a combination of circulators and tunable filters may also be used as an add-drop unit.

Particularly advantageous is the use of tunable controllable filters, the transmission loss and reflection loss of which for example are thermally controllable and, as a result, make a reconfiguration possible without disturbing operation on the through-connected channels.

In addition, drop&continue channels which can be remotely configured with the aid of a further module type are advantageously used according to the invention for realizing broadcast functionalities.

Exemplary embodiments of the invention are explained in more detail with reference to the drawing figures.

DESCRIPTION OF THE PREFERRED EMBODIMENTS

Figure 1:
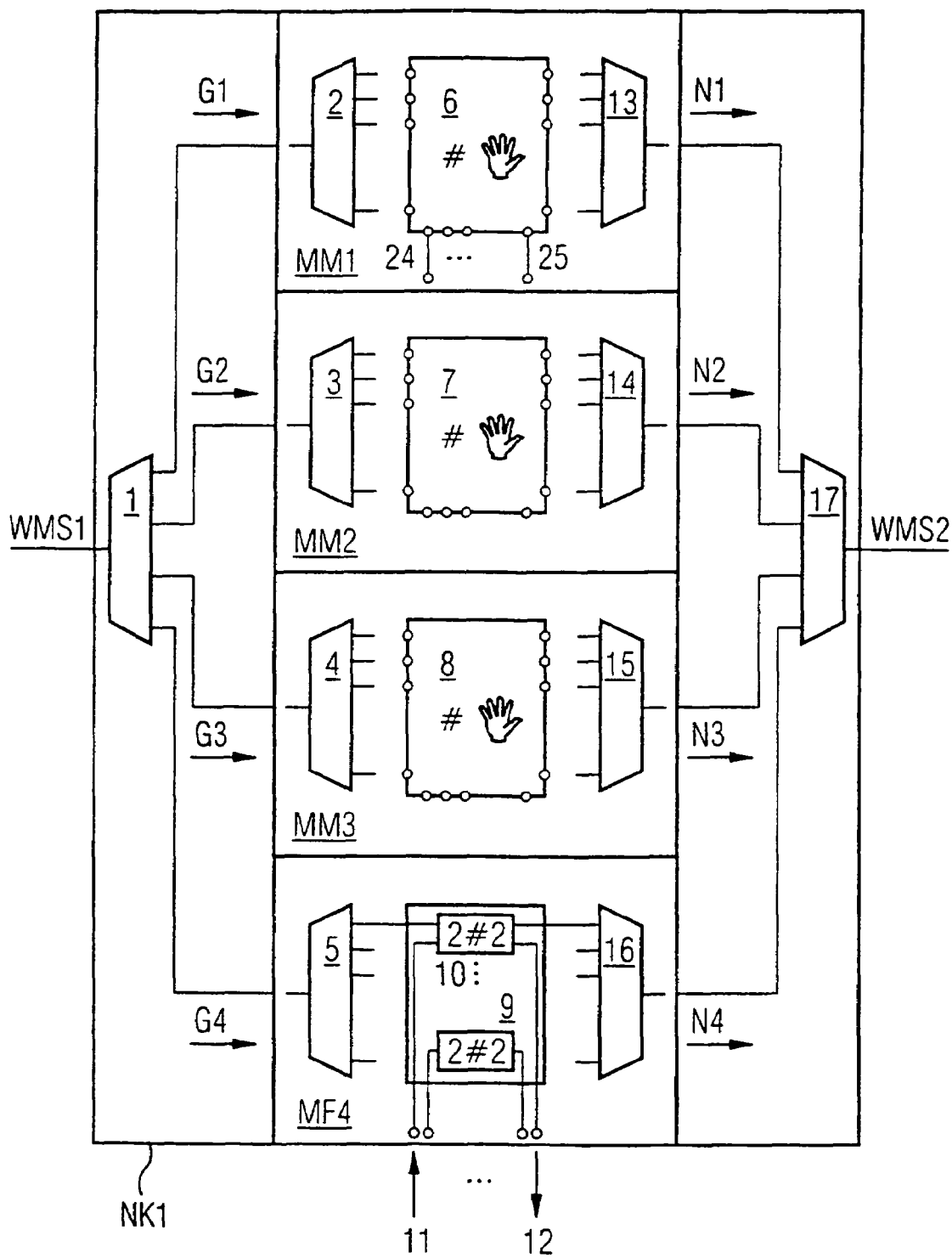
FIG. 1 shows an add-drop multiplexing device for static and remote-configurable connections.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alternations and further modifications in the illustrated device, and such further applications of the principles of the invention as illustrated therein being contemplated as would normally occur to one skilled in the art to which the invention relates.

Figure 2:
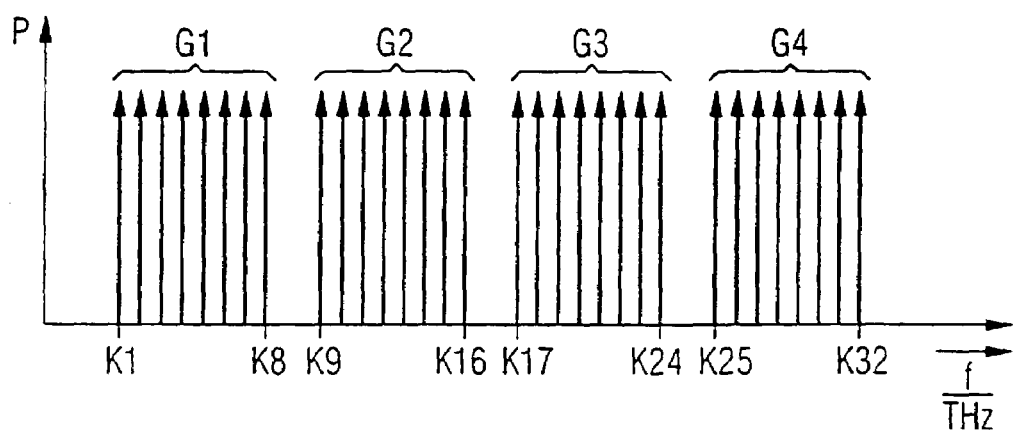
FIG. 2 shows a frequency diagram of an optical WDM signal.

Represented in FIG. 1 is an add-drop multiplexing device (often referred to for short as an add-drop multiplexer or a network node, cross-connector or through-connecting device) NK1. An incoming optical WDM signal WMS1 is initially fed to a group filter 1. This divides the signal WMS1 into four different channel groups G1 to G4 in a way corresponding to FIG. 2. The static connections are assigned to the channel groups G1 to G3, while all the short-term connections are assigned to the fourth channel group G4. Each of these channel groups is respectively assigned a module MM1 to MM3 and MF4, to allow specific channels to be branched off and inserted and other channels to be connected through. In this case, it is expedient for reasons of expenditure and is required in the case of certain embodiments to assign channels which are adjacent in terms of frequency to one channel group. However, a functional connection-oriented assignment is also possible.

In the case of the module MM1, only two add-drop terminals 24 and 25 are denoted for reasons of overall clarity. The channels of this module which are to be sent are combined in a WDM multiplexer 13. The module has a manual patch panel 6, with which any desired connections can be manually made with the aid of what are known as "patch cords". The modules M2 and M3 likewise contain in each case a WDM demultiplexer 3 and 4, respectively, a manual patch panel 7 and 8, respectively, and a WDM multiplexer 14 and 15, respectively. Only the fourth module has between its WDM demultiplexer 5 and its WDM multiplexer 16 a remote-configurable patch panel 9 with a plurality of switching matrices 10 with four terminals in each case. Each of these switching matrices allows a "channel" separated by the WDM demultiplexer 15 to be connected through or branched off and inserted into a corresponding "channel". The drop terminal of one of two switching matrices represented is denoted here by 11 and the add terminal is denoted by 12. The channel groups N1 to N4 reconfigured with the aid of the WDM multiplexers 13 to 16 are combined by a combination filter 17 and sent.

Each add-drop multiplexer can be adapted to requirements by exchanging modules. If, for example, a higher proportion of remote-configurable connections is desired, the module MM3 can be replaced for example by a type of the module MF4. For reasons of overall clarity, only for one direction of transmission and only the elements essential for the invention have been represented. In the case of bidirectional connections, an identical arrangement is provided for the opposite direction.

Figure 3:
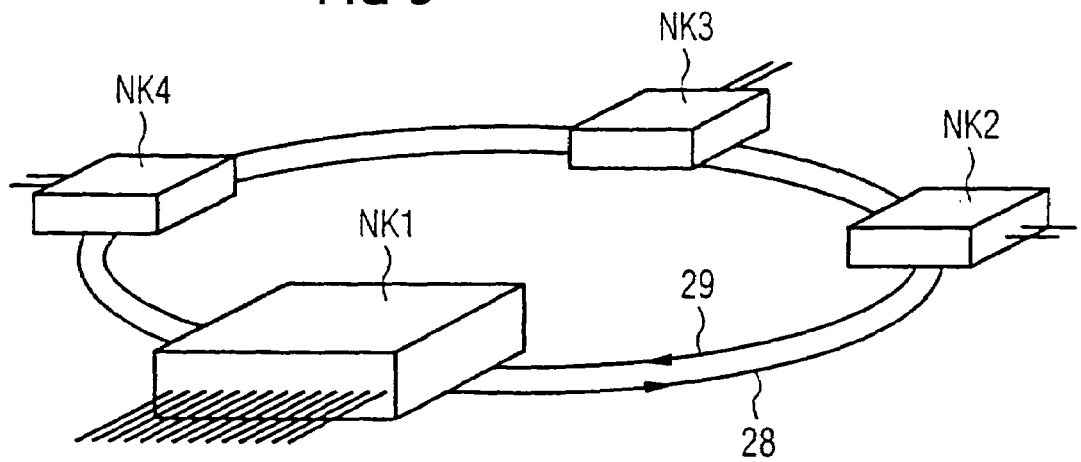
FIG. 3 shows a ring network.

In optical rings in which these network elements are used, it is possible both for genuine ring traffic to be conducted, as known from synchronous networks, and also for what is known as HUB traffic to be carried out in a way corresponding to FIG. 3, requiring various add-drop multiplexers which are connected in the form of a ring via optical waveguides 28 and 29. A first add-drop multiplexing device NK1 serves as a central node (master node), which logically distributes the traffic in a double-star shape to the other add-drop multiplexers. The master node must correspondingly have an add-drop capacity of 100%, as is represented in FIG. 1, with 75% static traffic and 25% remote-configurable traffic (for example in a way corresponding to FIG. 1). The other multiplexers/network nodes NK2, NK3 and NK4 require only a relatively small add-drop capacity, of which in turn only a part must be remote-configurable. A major part of the traffic, concentrated on certain channel groups, is connected through.

Figure 4:
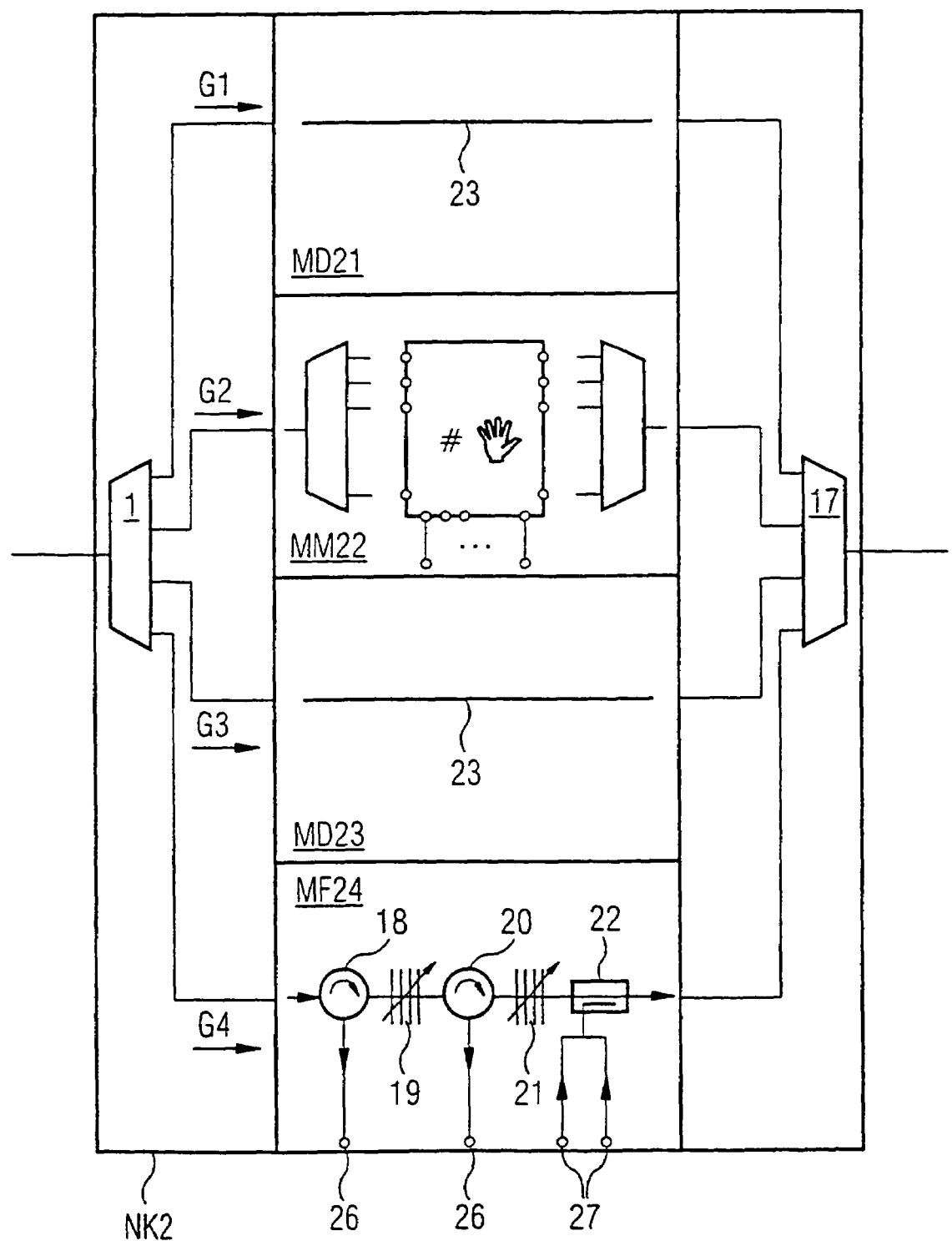
FIG. 4 shows a variation of the add-drop multiplexing device.

An add-drop multiplexing device possible for the network nodes NK2 to NK4 is represented in FIG. 4. It contains two modules MD21 and MD22, which comprise in each case an optical connecting line 23. A further module MM22 is in turn provided for static connections and the module MF24 is provided for remote-configurable connections. This module contains at least one circulator 18 and a tunable filter 19, with the aid of which individual wavelengths, and consequently individual channels, can be branched off. With the aid of further circulators 20 and tunable filters 21, further channels (or else groups of a plurality of channels) can be branched off at drop outputs 26. The corresponding channels (with new data) are inserted via add inputs 27 and a coupler 22.

It is particularly advantageous if the module MF24 is designed in such a way that, during a reconfiguration, i.e. during detuning of the filters 19 and 21, the other connected-through channels are not disturbed. This may take place by bridging the filters or by thermally influencing the filters, by which the filter properties are largely reduced. Corresponding filters and corresponding add-drop-continue modules are described in German Patent Application DE 19846674.9. The module MM22, the group filter and the combination filter coincide with the network node NK1.

Figure 5:
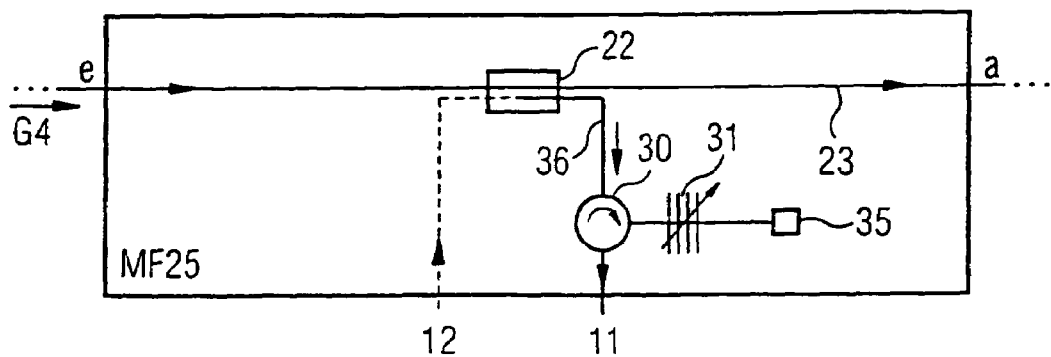
FIG. 5 shows a variation of a drop&continue module.

Represented in FIG. 5 is a variation of a drop&continue module MF25 for remote-configurable drop&continue channels, which has a coupler 22, a circulator 30, a tunable filter 31 and also an absorber 35. The continue functionality of the drop&continue module MF25 is realized with the aid of an optical connecting line 23, which connects the input e of the drop&continue module MF25 via the coupler 22 to the output a of the drop&continue module MF25 and via which, for example, all the short-term connections of the fourth channel group G4 are transmitted. The drop functionality of the drop&continue module MF25 is realized in particular with the aid of the coupler 22, the tunable filter 31 and the circulator 30, a part of the optical WDM signal representing the fourth channel group G4 being coupled out by the coupler 22 and transmitted via a further optical connecting line 36 to the circulator 30. Consequently, a single channel, for example channel K25, of the channel group G4 can be branched off via the tunable filter 31. The part of the coupled-out optical WDM signal not separated by the tunable filter 31 and representing the fourth channel group G4 is passed on to the optical absorber 35, which is provided for the disposal of these non-reflected WDM channels K26 to K32. In addition, the drop&continue module MF25 may optionally be extended with the aid of an add terminal 12, which is led to the coupler 22, to form an add-drop&continue module—indicated in FIG. 5 by an add terminal line 12 depicted by dashed lines. In this case, only WDM signals of a wavelength outside the wavelength range which can be extracted by the tunable filter 31 can be fed in or "added".

Figure 6:
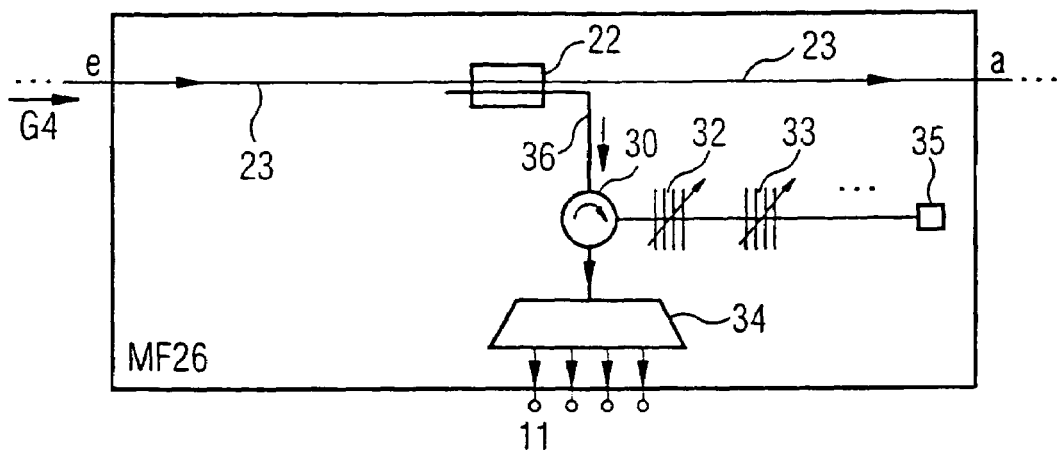
FIG. 6 shows a further variation of a drop&continue module.

Represented in FIG. 6 is an extended module MF26 of the drop&continue module MF25 represented in FIG. 5, for the branching off of a plurality of channels K25 to K32 of the fourth channel group G4. This extended module MF26 has for this purpose, for example, a further tunable filter 33 and a WDM demultiplexer 34, intended for the separation of the backscattered channels K25 to K32. With the aid of this extended module MF26, the channel selectivity of the drop&continue module MF26 can be advantageously increased, which is advantageous when there are a large number of WDM channels.

Figure 7:
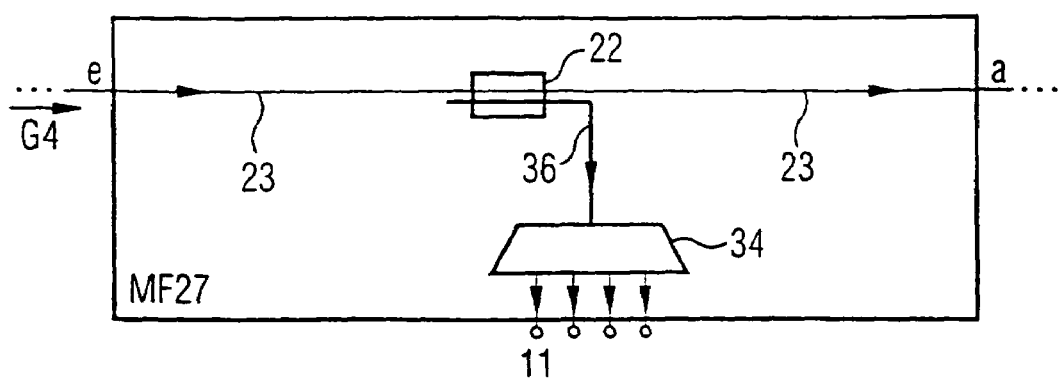
FIG. 7 shows a simplified embodiment of a drop&continue module.

Represented in FIG. 7 is a simplified embodiment of the drop&continue functionality in a further module MF27, in which a part of the optical WDM signal representing the fourth channel group G4 is led directly to a WDM multiplexer 34 with the aid of a coupler 22, which is connected into the optical connecting line 23, via an optical connecting line 36. With the aid of the WDM multiplexer 36, the respective WDM channel K25 to K32 is subsequently branched off and led to the respective drop terminal 11. An embodiment of a drop&continue module of this type can be advantageously used in particular in the case of a low channel density per channel group G1 to G4.

It goes without saying that a plurality of the add-drop multiplexers described above may also be connected in series in a network terminal.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A configurable add-drop multiplexing device for an optical wavelength division multiplex transmission system, comprising:
    a group filter which divides an incoming WDM signal into a plurality of channel groups with channels of different wavelengths;
    a plurality of different exchangeable modules types, each connected to a respective channel group for connecting through and branching off channels, wherein each of plurality of different exchangeable modules comprise at least two of a first, a second, and a third module type, and inserted according to the following requirements:
        the first module type being for manual reconfiguration of connected-through and add-drop channels with which longer-term connections of the channels of a channel group are realized;
        the second module type being for remote configuration of channels to be connected-through and add-drop channels of one of the channel groups with which short-term connections of the channels of the one channel group are realized;
        the third module type utilized for closed connecting-through of a channel group; and
    a combination filter which receives and combines reconfigured channel groups outputted from the plurality of different exchangeable modules depending on their type, wherein the combination filter forms an outgoing WDM signal.

2. The add-drop multiplexing device of claim 1 wherein the first module type comprises substantially a WDM demultiplexer, a manually configurable switching unit, and a WDM multiplexer.

3. The add-drop multiplexing device of claim 1 wherein the second module type comprises a WDM demultiplexer, a remote-configurable switching unit, and a WDM multiplexer.

4. The add-drop multiplexing device of claim 1 wherein the second module type comprises an add-drop-continue device with a series connection of at least one circulator, a tunable filter, and a coupling-in device.

5. The add-drop multiplexing device of claim 4 wherein the transmission loss of the tunable filter is adjustable.

6. The add-drop multiplexing device of claim 5 wherein the transmission loss of the tunable filter is thermally adjustable.

7. The add-drop multiplexing device of claim 4 wherein narrow-band series-connected Bragg channel filters are provided which are tuned with regard to resonant wavelength having a stop band which is so narrow that a filter tuned to a wavelength lying between the channels significantly does not influence a function of adjacent channels.

8. The add-drop multiplexing device of claim 7 wherein the series connection of the tunable filters is terminated by an optical absorber into which non-reflected WDM signals are directed.

9. The add-drop multiplexing device of claim 1, wherein the third module type comprises an optical connecting cable.

10. The add-drop multiplexing device of claim 1, further comprising a fourth module type, wherein said fourth module type establishes a remote configuration of drop-continue channels by coupling out a part of an incoming signal of a channel group and transmitting the other part.

11. The add-drop multiplexing device of claim 10 wherein the fourth module type comprises:
    a coupling device for coupling out at least part of a signal representing the incoming channel group;
    a circulator; and
    at least one tunable filter for coupling out specific channels of said channel group.

12. The add-drop multiplexing device of claim 11 wherein, the fourth module includes a plurality of tunable filters and an additional WDM demultiplexer receiving the coupled-out part of the signal representing the channel group, designated for outputting at least a number of the channels which corresponds to a number of the tunable filters.

13. The add-drop multiplexing device of claim 10 wherein the fourth module type has a coupling device for coupling out at least part of the incoming WDM signal representing the incoming channel group, and at least one filter arrangement acting as a WDM demultiplexer for separating the coupled-out WDM signal into a plurality of channels of different wavelength.

14. The add-drop multiplexing device as claimed in claim 1 wherein the channels of at least one of the channel groups are adjacent in terms of frequency.

15. A wavelength division multiplex transmission system, comprising:
    a plurality of add-drop multiplexing devices connected to one another via optical waveguides; and
    each of the add-drop multiplexing devices comprising:
    a group filter which divides an incoming WDM signal into a plurality of channel groups with channels of different wavelengths,
    a plurality of different exchangeable modules types each of which connects to a respective channel group for connecting through and branching off channels, wherein
    the exchangeable modules comprise at least two of first, second, and third module types,
        the first module type being for manual reconfiguration of connected-through and add-drop channels with which longer-term connections of the channels of a channel group are realized,
        the second module type being for remote configuration of channels to be connected through and add-drop channels of one of the channel groups with which short-term connections of the channels of the one channel group are realized, the third module type utilized for closed connecting-through of a channel group, and
    a combination filter which receives and combines reconfigured channel groups outputted from the plurality of different exchangeable modules depending on their type, wherein the combination filter forms an outgoing WDM signal.

16. A configurable add-drop multiplexing device for an optical wavelength division multiplex transmission system, comprising:
    a group unit which divides an incoming WDM signal into a plurality of channel groups;

a plurality of different exchangeable modules each of which connect to a respective channel group for connecting through and branching off channels, wherein the exchangeable modules comprise at least two of a first, a second, and a third module types;
  the first module type being for manual reconfiguration of connected-through and add-drop channels with which longer-term connections of the channels of a channel group are realized;
  the second module type being for remote configuration of channels to be connected through and add-drop channels of one of the channel groups with which short-term connections of the channels of the one channel group are realized;
  the third module type being for closed connecting-through of a channel group; and
a combination unit the receives and combines reconfigured channel groups outputted from the plurality of different exchangeable modules depending on their type, wherein the combination unit forms an outgoing WDM signal.

* * * * *